United States Patent

[11] 3,620,763

| [72] | Inventor | Richard G. Hans<br>Louisville, Ky. |
|---|---|---|
| [21] | Appl. No. | 801,777 |
| [22] | Filed | Feb. 24, 1969 |
| [45] | Patented | Nov. 16, 1971 |
| [73] | Assignee | The Pillsbury Company<br>Minneapolis, Minn. |

[54] REFRIGERATED BATTER PRODUCTS AND METHOD FOR PREPARING SAME
39 Claims, No Drawings

[52] U.S. Cl. .................................................. 99/92,
99/189, 99/192 BB
[51] Int. Cl. ........................................ A21d 13/08,
A21d 4/00
[50] Field of Search ............................... 99/92, 172,
192 R, 192 BB, 189

[56] References Cited
UNITED STATES PATENTS

| 2,810,650 | 10/1957 | Joslin | 99/92 X |
|---|---|---|---|
| 2,982,662 | 5/1961 | Cochran et al. | 99/92 X |
| 3,021,220 | 2/1962 | Going et al. | 99/92 |

*Primary Examiner*—Raymond N. Jones
*Assistant Examiner*—James R. Hoffman
*Attorneys*—Ronald E. Lund, James V. Harmon and M. Paul Hendrickson ABSTRACT: Batters suitable for distribution in a pressurized container under refrigerated conditions are provided by employing, as batter ingredients in specified amounts, flour, water, and edible humectant, a hydrophilic film former, and a chemical leavening composition which generates a sufficient amount of pressure to maintain an internal can pressure ranging from about 10 to about 20 p.s.i. Even after storage for several weeks, the batters are stable against microbial degradation while maintaining the batter product in a convenient ready-to-bake form. Stability of the batter against volume, grain and texture degradation is excellent.

REFRIGERATED BATTER PRODUCTS AND METHOD FOR PREPARING SAME

This invention relates to refrigerated batter products suitable for distribution in a pressurized container. More particularly, the present invention relates to batters possessing excellent stability against degradation. The batters are suitable for chemically leavened refrigerated batters and adaptable for distribution in a pressurized container.

The food industry has devoted a considerable amount of effort in providing bakery products requiring a minimum amount of preparation on behalf of the homemaker. Although a totally baked product provides the ultimate convenience to the homemaker, a substantial number of homemakers prefer to bake the product. To fulfill this need, dry bakery mixes have received wide commercial acceptance by the homemaker. Refrigerated doughs in pressurized containers have likewise fulfilled this need. The refrigerated doughs are considerably more convenient since they require only a baking step whereas dry mixes require an additional batter or dough preparation step.

Within the last 20 years, the art has attempted to provide commercially ready-to-bake, undeveloped dough or batter products which are similar to commercially available refrigerated doughs. U.S. Pat. No. 2,478,618 by Armstrong, et al. discloses dough products suitable for packaging in a pressurized dough container. Although the teachings of the Armstrong, et al. patent are primarily directed to dough products, the patentees teachings also find application to numerous other bakery products such as rolls, breads, cookies, cakes, crullers, pancakes, dumplings, etc.

Unfortunately, the art in its quest to provide an undeveloped dough product in a pressurized container has encountered considerable difficulty. These difficulties are well illustrated by U.S. Pat. Nos. 2,810,650 by R. P. Joslin; 2,982,662 by D. M. Cochran, et al. and 3,021,220 by L. H. Going, et al.

According to the teachings of Joslin, conventional leavening systems are ineffective in a refrigerated batter product since the leavening acid and base react prematurely. As a result, conventional leavening systems fail to provide the prerequisite leavening action during the baking cycle. Joslin obviated this problem through the use of a dicalcium phosphate dihydrate leavening acid. The dicalcium phosphate dihydrate is substantially nonreactive at temperatures less than 160° F. Thus, the leavening acid does not fully react with the leavening base until the refrigerated batter product is baked. Pursuant to the Joslin teachings, the resultant refrigerated batters are placed in a suitable container under little, if any, pressure. The Joslin patent differs substantially from that of Armstrong, et al. in that the Armstrong, et al. dough system creates an internal pressure via partial reaction of the leavening acid and base therein (i.e., the released carbonation therefrom) whereas Joslin does not. In addition, the Joslin batter product is relatively unstable against migration and syneresis of water upon storage. Consequently, after a relatively short period of storage under refrigerated conditions, baked products prepared therefrom exhibit substantial deterioration in respect to volume, texture, grain, etc. over those prepared from a fresh batter.

The Cochran, et al. patent is directed to improving storage stability of the Joslin batter product. Similar to Joslin, the Cochran, et al. patent discloses a batter adapted to be stored at temperatures below 45° F. The refrigerated batter of Cochran, et al. also utilizes a high-temperature leavening acid (i.e., the dicalcium phosphate dihydrate) which reacts during the baking cycle. According to the Cochran, et al. patent, satisfactory bakery products (e.g., cakes) cannot be obtained from conventional batters (e.g., of the type employed by Joslin) which have been refrigerated for prolonged periods of time. To obviate this storage problem, Cochran, et al. homogenizes the batter and then allows the batter to age for several days. After aging of the batter, soda is added to the resultant aerated batter. Aeration of the batter is facilitated by emulsification. The aged batter of Cochran, et al. provides little, if any, internal pressure when stored under refrigerated conditions.

Although the batter product prepared in accordance with the Cochran, et al. teachings allegedly provides a satisfactory baked product, the aging step under refrigeration (i.e., for 3 to 10 days) is not suitable for either economical or mass production of a refrigerated batter product (e.g., batter must be aged before chemical leavening is incorporated into the batter). Since the leavening as provided in the batter is substantially unreacted upon at temperatures below 160° F., such a batter product is not suitable for distribution in a pressurized container as used for refrigerated dough products. Moreover, the utilization of substantial quantities of emulsifier in the batter product substantially increases the batter cost. Furthermore, the incorporation of substantial amounts of air into the batter products prior to the packaging thereof substantially increases the accessibility of the product to microbial degradation by aerobic micro-organisms.

The Going, et al. patent also discloses a refrigerated batter product which differs from both Cochran, et al. and Joslin in that the leavening system is eliminated from the refrigerated batter product. Consequently, the ultimate consumer thereof adds the leavening agents to the batter product just prior to baking. A major problem in respect to Going, et al. is prevention of microbial growth. To accomplish this result, Going, et al. pasteurize the batter along with an acid to retard or inhibit any further microbial growth. The resultant refrigerated batters of Going, et al. are allegedly stable against microbial growth when stored over prolonged periods of time. Since the Going, et al. refrigerated batter product does not contain leavening, the resultant batter cannot merely be placed in a baking pan and baked (i.e., it is not a ready-to-bake product such as disclosed by Armstrong, et al.). Although the Going product is allegedly stable against microbial growth, the resultant batter thereof is similar to the Joslin product in that it is relatively unstable upon storage against migration and syneresis of water.

It is an object of the present invention to provide a ready-to-bake refrigerated batter.

Another object of the invention is to provide a batter which exhibits stability against microbial growth under refrigerated storage conditions.

A further object of the invention is to provide a batter which provides an acceptable volume, texture and grain when stored at refrigerated conditions over prolonged periods of time.

An additional object of the invention is to provide an efficient and economical process for preparing a novel batter product suitable for storage under refrigerated conditions in a pressurized container.

A still further object is to provide a batter which is stable against coalescence of gas and migration and syneresis of water when stored under refrigerated conditions.

According to the present invention there is provided an edible batter suitable for distribution within a pressurized container, said batter being comprised of a homogeneous admixture of:
  a. 100 parts by weight farinaceous material;
  b. from 50 to 200 parts by weight water;
  c. from about three to about 50 parts by weight of an edible humectant;
  d. from about 0.02 to about 25 parts by weight of a polysaccharide hydrophilic film-forming agent;
  e. from 0.7 parts to about 7.0 parts by weight of a chemical-leavening composition comprised of at least one leavening base and at least one leavening acid with at least 10 percent by weight but less than 30 percent by weight of the total chemical leavening acid being capable of reacting with said batter leavening base in 60 minutes at a temperature of 60° F. and a pressure of 760 millimeters; the total amount of leavening acid contained within the batter being characterized as providing at least 0.0003 part moles of carbon dioxide within 60 minutes when said leavening acid is reacted with a stoichiometric amount of sodium bicarbonate at 60° F. and 760 millimeters pressure;

said batter being further characterized as having a sufficient amount of polysaccharide hydrophilic film former in combination with the other batter ingredients to provide a batter having an "S-value" ranging from at least 10 millimeters to about 60 millimeters when said 400 grams of batter containing all of the batter ingredients except chemical leavening composition is aerated in a standard household mixer equipped with a 6-inch standard mixing bowl at 550 r.p.m. for 3 minutes at 20° C. with said batter exhibiting a maximum change in "S-value" readings of no greater than 25 percent when "S" readings for said batter are determined at 15, 45, 140 and 180 minutes after said batter has been aerated; and the batter having a sufficient amount of edible humectant to provide a batter having a water activity ranging from about 0.80 but no greater than 0.94.

Unexpectedly, it has been discovered that the batters provided herein exhibit excellent stability against microbial growth even when stored for several weeks in a pressurized container at temperatures below 50° F. Unlike previous refrigerated batters, the instant batters are suitable to be stored for several weeks in a pressurized container at an internal can pressure of about 10 to about 25 p.s.i. After several weeks of storage, the leavening activity of the instant refrigerated batter is sufficient to provide a baked product with an excellent grain, texture and volume. As a result, the homemaker is provided with a batter which need only be placed in a pan and baked. In the absence of special process conditions to modify the batter flour (e.g., aging of the flour per the Cochran, et al. teachings), the present batters exhibit excellent resistance to migration and/or syneresis of water therefrom even when refrigerated for several weeks. Similarly, upon prolonged storage (e.g., greater than 90 days) under refrigerated conditions in a pressurized container, the present batters have an inherent ability to maintain carbon dioxide uniformly distributed throughout the batter (e.g., the batter inhibits migration and/or coalescence thereof).

The present invention is applicable to a wide range of undeveloped dough products. An undeveloped dough differs from a developed dough in that the former is not adequately mechanically worked to develop a dough elasticity and a cell structure capable of retaining gas. In general, a developed dough is characterized as having an extensographic reading exhibiting a resistance to extension ranging from at least 400 to 1,000 Brabender units and an extensibility greater than 60 to about 250 millimeters and a maximum farinographic reading ranging from greater than 600 to less than about 1,300 Brabender units. Since an undeveloped dough (i.e., batters of the type disclosed herein) exhibits flowability characteristics, neither extensibility nor resistance to extension readings can be ascertained by the Brabender test methods therefor. As is well known to one of ordinary skill, farinographic readings may be ascertained by the methodology disclosed in the American Association of Cereal Chemists, Method 54.21, for example, with a Brabender Farinographic Model PH2H equipped with a sigma blade, stainless steel mixer bowl by C. W. Brabender Instruments and a heat transfer of water pressure means for operating at a temperature of 60° F. Similarly, extensographic readings may be ascertained by the American Association of Cereal Chemists, Method 54.10, utilizing the Extensograph Model E1 supplied by C. W. Brabender Instruments equipped with a temperature control bath operated at 60° F.

The chemically leavened batter products to which the present invention is directed are products similar to commercially available dry baking mixes which utilize chemical leavening or yeast as a leavening agent and provide a batter product upon reconstitution with an aqueous medium. Illustrative batter products include cakes, rolls, biscuits, cobblers, shortbread fritters, cornbread, bread, pancakes, muffins, doughnuts, dumplings, quickbreads, puffed snacks and other similar products.

Exemplary chemically leavened batters to which the present invention is adaptable include the shortening and nonshortening based cake batters. Shortening based cake batters such as white and yellow layer cakes broadly contain on a dry weight basis from about 20 percent to 50 percent flour, about 20 percent to 70 percent sugar, about 5 percent to 20 percent shortening and from about 0.5 to about 4 percent chemical leavening. Nonshortening based cake mixes such as the chemically leavened angel food cake mixes, as disclosed in U.S. Pat. No. 3,038,808 by J. R. Perrozzi, et al., are broadly comprised of about 10 to about 30 weight percent flour, about 50 to 75 weight percent sugar, about 5 to about 20 weight percent egg albumen (dry weight basis) and from about 1 to about 8 weight percent chemical leavening.

Leavened bread batters of an undeveloped character contemplated herein broadly comprise about 35 to about 80 percent flour, 5 to 50 percent sugar and chemical leavening in an amount ranging from about 2.0 to about 8 weight percent with about 2 to 10 weight percent shortening. Also included are biscuit batters of an undeveloped character which broadly contain from 75 to 90 percent by weight flour (usually 80 to 85 percent flour), about 5 to about 10 percent by weight shortening or fat and about 2 to about 5 percent by weight chemical leavening.

Broadly, the batters prepared in accordance with the present invention on a batter solids basis may contain chemical leavening, sucrose in an amount ranging from 0 to about 90 weight percent, from about 10 to 90 percent flour and shortening in an amount of from 0 to about 15 percent.

The farinaceous materials of the batter will differ and depend largely upon the desired bakery product. Suitable farinaceous materials include cereal flours such as wheat, rice, oat, maize, barley and rye with wheat flour being the preferred flour. Conventional roller milled flours, turbo-milled flours and/or air classified fractions thereof, for example, as disclosed in U.S. Pat. Nos. 3,077,408 and 3,077,308 by T. A. Rozsa, et al. are illustrative flours which are adaptable to the present baking mix concentrate. Hard wheat, soft wheat, bleached and unbleached flours and flour substitutes such as a mixture of starch granules and cereal flour proteins may also be employed as the farinaceous component. Although cereal flours having a protein content ranging from about 4 to about 28 percent may be adapted to the present batters, those flours of at least 5 to about 20 percent protein content are advantageously employed. Superior batters are provided by hard and soft wheat flours with a protein content of at least 7.5 to about 15 percent.

In preparing the batter composition in the present invention, there is provided as batter ingredients from at least 50 to less than about 200 parts by weight water for each 100 parts by weight farinaceous material. Improved bakery products exhibiting excellent grain, texture and volume are provided by employing from 75 to 175 parts by weight water for each 100 parts by weight of farinaceous material. Superior baked products are provided when the amount of batter water ranges from 90 to 150 parts by weight for each 100 parts of farinaceous material.

In addition to the flour and water, the batters contain at least one edible humectant in an amount sufficient to reduce the water activity from about 0.80 to no greater than 0.94. The edible humectants employable herein have an affinity for water and usually maintain a narrow moisture content fluctuation when exposed to a wide range of humidities.

In general, the humectants employable herein normally exhibit either solid or liquid properties (i.e., nongaseous) at room temperature. In contradistinction to the polysaccharide film formers hereinafter described which generally have a molecular weight in excess of 10,000, the edible humectants have a molecular weight of less than 10,000. Suitable edible humectants include the edible polyhydric alcohols (containing more than two carbon atoms and at least two alcohol moieties) such as glycerol, propylene glycol, the polyethylene glycols (e.g., 300 to 6,000) and the sugar alcohols (e.g., the straight chain tetra, penta and hexahydric alcohols such as mannitol and sorbitol). Other materials which exhibit humectant properties include the carbohydrate humectants which have a molecular weight of less than 10,000 and normally less than 2,000. Suitable carbohydrate humectants include the monosaccharides and polysaccharides (e.g., carbohydrates which yield at least two but less than 10 molecules of monosaccharide on hydrolysis) but excluding the nonreducing disaccharides such as sucrose which does not possess humectant properties and other polysaccharide humectants possessing a molecular weight of less than 10,000. Typical carbohydrate humectants include the low molecular weight dextrins, lactose, dextrose, maltose, fructose, raffinose and invert sugar-containing materials such as molasses, honey, brown sugar, papalon, fruit juices, starch hydrolysates (e.g., corn syrup, sorghum, etc.) as well as the aqueous solutions thereof and invert sugar itself. Other solid humectants include metal salts (especially the alkali and alkaline earth halides such as calcium chloride, sodium chloride and potassium chloride with the sodium salt being preferred).

The amount of edible humectant provided in the batter product will depend to a large extent upon the amount of free moisture in the batter as well as the effectiveness of the humectant in reducing the amount of free moisture. In general, the amount of humectant ranges from at least three to about 50 parts by weight humectant for each 100 parts by weight of farinaceous material contained within the batter. To provide a refrigerated batter possessing exceptional storage stability the amount of humectant provided therein should be sufficient to impart a water activity of less than 0.90. To achieve a batter possessing greatly enhanced storage stability, the amount of humectant ranges from at least five to about 35 parts by weight. Exceptional storage stability as evidenced by the grain, texture and volume of the baked product thereof is provided when 10 to 30 parts by weight edible humectant for each 100 parts by weight farinaceous material are employed as a batter ingredient.

The water activity level or the free moisture content of the batter may be referred to as "available water" or $a_w$ defined as follows:

$a_w$=moles of solvent/moles of solute+moles of solvent

Water activity of the batter can be determined by any well-known method as for example by measuring the humidity of the atmosphere surrounding the sample or by direct measurement (e.g., with a humidity measuring apparatus sold under the trademark "SINASCOPE" manufactured by Hans Sickinger Company, Pontiac, Michigan). The edible humectant is essential in the present invention to reduce the amount of free or available moisture within the batter product. Since microbial growth is dependent upon available water, the edible humectants reduce the amount thereof and thus provide a microbiologically stable product. In addition to inhibiting microbial growth, the edible humectants also aid in preventing migration and/or syneresis of the water within the batter product.

The polysaccharide hydrophilic film formers adaptable to the present invention have the physical characteristics of being hydrophilic colloid forming, water-dispersible, organic solvent-phobic (i.e., generally insoluble in liquids) and amorphous. Upon addition to water, those hydrophilic film formers have the characteristics of balling or agglomerating and/or forming thick, sticky masses even in the presence of very large quantities of water. In general, the employable hydrophilic film formers have a molecular weight greater than 10,000 and behave much like flour when added to water in that they ball or form lumps in which there is a pasty skin of wetted hydrocolloids enclosing a core of dry gum. The hydrophilic film formers have a tendency to agglomerate (i.e., clump and form soft, semisolid masses in water).

Both naturally occurring and synthetically produced polysaccharide film formers may be employed in the present batter. Illustrative polysaccharides include the water-dispersible cellulose derivatives such as sodium carboxymethyl cellulose, hydroxypropylmethyl cellulose ether, carboxymethyl cellulose, hydroxypropylethyl cellulose ether, hydroxypropyl cellulose ether; the tree and shrub extracts such as tragacanth, arabic, ghatti, furcelleran and the salts of furcelleran (sodium, calcium, potassium and ammonium salts), karaya, seaweed colloids such as agar, carrageenin and the salts thereof (e.g., ammonium, calcium, potassium and sodium salts) the alginates (e.g., the calcium, potassium, sodium alginates and propylene glycol alginates), gelatinized starches and starch derivatives (e.g., hydroxypropyl starch, modified starches such as those treated with succinic anhydride, sodium hydroxide, aluminum sulfate, dextrin including corn syrups containing dextrin, etc.); pectins such as citric pectin, low methoxyl pectin and sodium pectinate; seed extracts such as locust bean, quince, oat gum and guar gum and other gumlike natural and synthetic hydrophilic colloids such as dextran and certain biologically produced polysaccharides such as disclosed in U.S. Pat. No. 3,301,848 by Frank E. Halleck; *Xanthamonas compestris* produced polysaccharides such as disclosed in the *Canadian Journal of Chemistry*, vol. 42 (1964), pages 1261–1269, mixtures of hydrophilic colloids and the like. Advantageously, polysaccharide film formers having a molecular weight in excess of 50,000 and preferably in excess of 100,000 are employed.

The amount of hydrophilic film former employed in the present batters will vary considerably depending upon the particular type of hydrophilic film former employed. Accordingly, certain hydrophilic film formers on a given weight basis will provide greater gas retention and entrainment properties than others. In general, those hydrophilic film formers capable of providing a more viscous, aqueous solution on a given weight basis entrain more carbon dioxide than those of a lesser viscosity. In addition to the hydrophilic film-forming character of the specific film former employed, the batter solids-to-water ratio has an effect upon the gas entrainment properties thereof. Batters having a high nonflour solids-to-water ratio require more film former than those having a lower ratio thereof.

A suitable method of ascertaining whether or not the batters contain an appropriate amount of hydrophilic film former is disclosed in U.S. Pat. No. 3,434,848, filed Aug. 24, 1966, by Morris H. Katz and entitled "Edible Dry Composition for Producing an Aerated Product." In accordance with the teachings thereof, there is disclosed a method which provides an objective measurement of the short gel character of a ductile mass (referred to an an "S-value"). Pursuant to the method disclosed therein, the "S-values" for the present batters may be obtained by placing the batter into an appropriate open container (e.g., a petri dish) and then adhesively engaging the batter surface with a flat surface member (e.g., a rough surfaced plastic disc). The adhesively engaged batter is then continuously withdrawn from the dish in the form of a filamentous batter mass at a constant speed (i.e., 25.4 millimeters per minute) until the filamentous mass ruptures. The short gel characteristics of "S-value" are obtained by measuring the distance the filamentous mass has traversed until it ruptures (i.e., beginning with the initial adhesive engagement to its point of rupture). In general, the batters (within three minutes preparation) of the instant invention have a short gel character or an "S-value" ranging from at least 10 to 60 millimeters. Batters which have an "S-value" ranging from 25 to 50 millimeters provide superior stable products as evidenced by the volume, grain and texture of the baked product thereof when said batters are stored under refrigeration for more than 90 days in a pressurized container.

In addition to possessing the aforementioned "S-value," the batters must be stable against substantial "S-value" change upon standing. Failure to provide a batter which is relatively stable against substantial "S-value" changes will adversely affect the gas retention and entrainment properties thereof (e.g., upon storage the desired volume, grain and texture of the baked product will not be achieved). Stability of the batter as a function of its gas retention and entrainment properties may be ascertained through comparative ascertainment of "S- values." A suitable stability test, also disclosed in the aforementioned copending application, entails aerating 400 grams of a batter containing all of the batter ingredients excepting the chemical leavening. Aeration of the batter may be accomplished with a standard household mixer equipped with a 6-inch mixing bowl and operated at a mixing speed of 550 r.p.m. for 3 minutes at 20° C. "S-values" for the resultant aerated batter are then determined at time intervals of 15, 45, 140 and 180 minutes. Batters which exhibit maximum "S-value" differential of less than 25 percent as ascertained at 15, 45, 140 and 180 minutes (i.e., 100×highest "S" reading—lowest "S" reading)/lowest "S" reading possess a sufficient degree of gas entrainment and retention for use as a batter in a pressurized container. Improved refrigerated batter products possessing enhanced baking characteristics and stability are provided when the maximum "S-value" differential is less than 20 percent and the "S-value" ranges from 25 to 50. Exceptional batters are provided with the maximum differential being no more than 10 percent and an "S-value" ranging from 35 to 45.

As previously mentioned, the amount of polysaccharide film former may vary considerably depending upon the particular properties of the film former employed. Consistent with the above "S-value" teachings, enhanced storage stability (as evidenced by the volume, grain and texture of the baked product) is generally achieved when 0.02 to 5 parts by weight film former for each 100 parts by weight batter farinaceous material are employed. Further improvements therein are achieved when the amount of polysaccharide film former ranges from 0.1 to 3 parts by weight for each 100 parts by weight farinaceous batter solids.

From a batter functionality viewpoint, the hydrophilic film former contributes extensively to its storage stability. In general, farinaceous materials which are reconstituted with water in a nondeveloped state (a batter versus a dough) possess little, if any, gas retention properties. In the present invention, the batter must provide a sufficient viscosity for the entrainment and retention of minute gas bubbles. The polysaccharide hydrophilic film former functions in combination with the other batter ingredients (e.g., the water-soluble batter solids) as a means of retaining the carbon dioxide generated by the uniformly distributed chemical-leavening composition therein. As such, the batter inherently possesses the ability to retain the released carbon dioxide as minute gas bubbles. Consequently, migration and/or coalescence of carbon dioxide into larger gas sites in inhibited.

Retention of the carbon dioxide within the batter in the form of minute gas sites is functionally important for several reasons. More uniform dispersion of the carbon dioxide (small gas sites versus large gas sites) throughout the batter product is believed to reduce subsequent microbial growth. Similarly, minute gas sites which are stable against coalescence under refrigerated storage conditions provide a multiplicity of gas sites or nuclei in respect to subsequent gas evolution during the baking cycle (e.g., from the unreacted chemical leavening and steam). Thus, the resultant baked products contain a more uniform cellular structure without concomitant voids (e.g., a baked product possessing an acceptable texture, grain and volume).

From a safety viewpoint, it is essential that a refrigerated bakery product in a pressurized container (with a chemical leavening in a reactive state) be permeable to any labile gas therein. The quantum of minute and uniformly dispersed gas sites (as opposed to a lesser number but larger gas sites) provided in the present batter enable the batter product to be effectively stored in a pressurized container without a concomitant gas loss. In contrast, a batter wherein substantial coalescence has occurred loses much of its effectiveness to entrain or retain the generated gas. Since the present batter *per se* provides a substantial external pressure and effective encapsulation of the entrained gas, the batter aids in maintaining the appropriate internal can pressure when stored in a pressurized container.

Equally important are the hydrophilic film formers which are functional in preventing the water separation of the batter upon storage. Freshly prepared batters, without hydrophilic film formers to supplement the lack of the farinaceous material film-forming characteristics, readily lose their homogeneity through syneresis and/or migration of water. In the present invention, the hydrophilic film former obviates this problem by stabilizing the batter against syneresis and/or migration of the water.

In addition to the above ingredients, the batters contain a chemical-leavening composition comprised of at least one leavening base and at least one leavening acid with the total amount of leavening acid contained within said batter being characterized as providing at least 0.0003 gram moles of carbon dioxide within 60 minutes when said acid is reacted with stoichiometric amount of sodium bicarbonate at 60° F. and 760 millimeters pressure, said batter containing at least 0.7 parts by weight to about 7.0 parts by weight chemical leavening composition with at least 10 percent by weight but less than 30 percent by weight of the total chemical-leavening acid being capable of reacting with said batter leavening base at a temperature of 60° F. and 760 millimeters.

Enhanced storage stability of batter products as evidenced by the grain, texture and volume of baked products thereof is provided when the total amount of leavening acid contained within said batter is characterized as providing at least 0.012 to 0.0036 gram moles of carbon dioxide within 60 minutes when said acid is reacted with stoichiometric amounts of sodium bicarbonate at 60° F. and 760 millimeters of pressure with at least 15 percent by weight but less than 25 percent by weight of the total chemical leavening being capable of reacting with said batter leavening base at a temperature of 60° F. and 760 millimeter of pressure. Batters providing superior storage stability are obtained when said batter contains a total amount of leavening acid characterized as providing about 0.0024 gram moles of carbon dioxide within 60 minutes when said acid is reacted with stoichiometric amounts of sodium bicarbonate at 60° F. and 760 millimeters of pressure with about 20 percent by weight of the total chemical-leavening acid being reacted within said batter at said temperature and pressure.

Edible chemical-leavening compositions include those conventionally employed in chemically leavened baking mixes provided at least a major portion of the leavening acid is provided by at least one or more leavening acids which have a neutralization equivalent of 50 or greater. These leavening compositions normally consist essentially of a leavening base and a leavening acid. Conventionally, an alkaline bicarbonate of baking grade such as sodium bicarbonate and potassium bicarbonate and one or more of the edible leavening acids are used for this purpose. Illustrative acids suitable for the batter products include glucono delta lactone, sodium acid pyrophosphate, sodium aluminum phosphate hydrate, sodium aluminum phosphate anhydride and hydrous monocalcium phosphate, monocalcium phosphate monohydrate, monosodium phosphate, alpha-glucoheptono-gamma-lactone, mixtures thereof and the like. Although minor amount of dicalcium phosphate dihydrate may be employed (e.g., generally 25 percent by weight), amounts greater than 50 percent by weight of the total leavening acid adversely affects the texture and grain of the resultant baked product. The amount of chemical leavening added to the batter varies over a wide range and depends to a large extent upon the particular desired end product as well as the neutralization equivalent of the leavening acid employed. Based upon 100 parts by weight of the farinaceous batter material, the amount of chemical leavening composition normally necessary to provide enhanced stability ranges from about one to five parts by weight with about two to about four parts by weight being generally employed to provide batters which when baked exhibit excellent grain, texture and volume when stored for 90 days or more under refrigerated conditions.

The gas entrainment and retention characteristics of the batter may be supplemented by edible emulsifiers which are normally employed in conventional cake mixes. In general, any edible emulsifier or combination thereof capable of facilitating gas incorporation and entrainment upon whipping of a reconstituted cake mix may be employed as an emulsifier ingredient.

Thus any edible emulsifier or combination thereof capable of facilitating gas incorporation and entrainment upon whipping of a reconstituted dry bakery mix or whipped topping mix may be used as an emulsifier ingredient. Typical emulsifiers include a combination of emulsifiers possessing a proper hydrophilic or lipophilic balance (i.e., HLB) such as those conventionally employed in whipped topping dry mixes. Illustrative emulsifiers include the partial fatty acid esters of glyceryl having at least one fatty ester group containing from 12 to 22 carbon atoms, the partial esters of fatty acids (e.g., 12 to 22 carbon atoms) and hexitol anhydrides, the polyoxyalkylene derivatives of partial esters of edible glycols and a higher saturated fatty acid (e.g., $C_{12}$ to $C_{22}$) and other surface active agents as well as mixtures thereof. Partial fatty acid esters of glyceryl having at least one fatty ester group are the monoglycerides and diglycerides such as glycerol monostearate, glycerol monooleate, glycerol monopalmitate, glycerol monolaurate, glycerol monomyristate, glycerol monobehenate, glycerol monopentadecanate, glycerol distearate, glycerol dipalmitate, glycerol dilaurate, glycerol monostearate monopalmitate, glycerol dibehenate, glycerol dimyristate, glycerol monostearate monoethanoate, glycerol monopalmitate monopropionate, glycerol monostearate monovalerate, glycerol monolaurate monocaprate, glycerol monomyristate monocaprate, acetylated monoglycerides (e.g., acetylated glycerol monostearate, acetylated glycerol monooleate, acetylated monopalmitate, etc. the glyceryl lacto esters of fatty acids such as glycerol lacto oleate, glyceryl lacto monopalmitate, partial esters of fatty acids include surface active agents such as propylene glycol monostearate, propylene glycol monopalmitate, propylene glycol monolaurate, propylene glycol monomyristate, sodium 2-stearyl lactylate and calcium 2-stearyl lactylate.

Edible partial esters of the fatty acids and hexitol anhydride (e.g., the hextans and hexides) include the reaction products of the fatty acids (preferably the fatty acids having between 16 and 18 carbon atoms) and the hexitol anhydrides such as the partial fatty acid esters of sorbide and sorbitan acid esters, the partial monomannitan and mannide fatty acid esters, and the galactitan and galactide fatty acid esters, mixtures thereof and the like. Illustrative partial esters of the fatty acids and hexitol anhydrides include mannitan dipalmitates and monopalmitates, mannitan monotearates and distearates, mannitan monolaurates and dilaurates, mannitan monoleates and dioleates, mannitan monopalmitate monostearate, mannitan monomyristates and dimyristates, mannitan tristearate, mannitan monobehenate, sorbide monolaurate, sorbide monooleate, sorbide monopalmitate, sorbide monobehenate, sorbide monostearate, sorbide distearate, galactitan monostearate and distearate, galacitan monolaurate, galacitan monobehenate, galactide monotearates and distearates, the sorbitan fatty acid esters, mixtures thereof and the like. Preferably employed as the partial esters of the fatty acids and hexitol anhydrides are the sorbitan fatty esters. Typical sorbitan fatty esters are those sorbitan fatty esters that have at least one fatty acid group containing from 12 to 22 carbon atoms and include sorbitan monostearate, sorbitan monopalmitate, sorbitan distearate, sorbitan dipalmitate, sorbitan monooleate, sorbitan dioleate, sorbitan dilaurate, sorbitan monolaurate, sorbitan monomyristate, sorbitan dimyristate, sorbitan tristearate, sorbitan monopropionate monostearate, mixtures thereof and the like.

Typical polyoxyalkylene derivatives of partial esters of fatty acids and hexitol anhydrides include polyoxyethylene (20) sorbitan monostearate, polyoxypropylene (20) sorbitan monostearate, polyoxyethylene (20) sorbitan tristearate, polyoxyethylene (5) sorbitan distearate, polyoxyethylene (15) mannitan monopalmitate, polyoxyethylene (10) mannitan dimyristate, polyoxyethylene (20) sorbitan dioleate, polyoxyethylene (20) sorbitan monooleate, polyoxypropylene (20) sorbitan monooleate, polyoxyethylene (20) galactitan monostearate, polyoxyethylene (20) galactitan dioleate and polyoxyethylene (30) sorbitan monostearate. Additional surface active agents include sucrose monostearate, sodium dioctyl sulfosuccinate, lecithin, hydroxylated lecithin, etc.

In general, the amount of edible emulsifier included within the batter ranges from about 0.4 to about 10.0 parts by weight edible emulsifier for each 100 parts by weight of batter farinaceous material. Advantageously, the amount of edible emulsifier based upon 100 parts by weight farinaceous batter material ranges from about 0.6 to about 8.0 with about 0.8 to about 6.0 parts by weight being preferred.

In addition to the aforementioned ingredients, the batters may also advantageously contain a proteinaceous hydrophilic film former to further supplement both the film-forming characteristics of the farinaceous material (e.g., the flour-protein) and hydrophilic film former. Most of the proteinaceous hydrophilic film formers are heat coagulated upon baking and thus provide a more rigid baked structure than those which contain a lesser amount thereof.

Excessive amounts of a heat coagulable proteinaceous film former which toughen the resultant baked product to an unacceptable level should not be employed in the batters. Exemplary proteinaceous film-forming substances for the instant batters include egg albumen, human serum albumen, sodium proteinate of soybean, wheat germ, sodium caseinate, nonfat dry milk solids, fish protein, bran protein, pea flour protein, bean flour protein and corn germ. The amount of proteinaceous film former in the batters may range up to about 10 percent of the total batter solids weight and usually ranges from about 1 to about 4 percent of the total batter solid weight.

The amount of sugar contained within the instant batter products may range from 0 to about 40 percent of the total batter weight depending, of course, upon the desired product. If sweetness is desired in the batter product, a proper selection of an edible humectant may impart a sufficient sweetness without necessitating nonhumectant sweetening agents. In addition thereto, sucrose may be added to the batters if desired as well as synthetic sweeteners such as cyclamic acid and saccharine and the alkali and alkaline earth salts thereof.

In addition to the aforementioned ingredients other conventional batter type ingredients necessary to complete the desired mix may be included. Illustrative additional ingredients include flavoring and coloring agents, nutrient supplements, preservatives, antioxidants, shortening or fat and the like.

The batters suitable for distribution in a pressurized container are prepared by a method comprising the steps of:

a. providing a batter comprised of a uniform blend mixture of:

a. 100 parts by weight farinaceous material;
  b. from 50 to 200 parts by weight water;
  c. from about three to about 50 parts by weight of an edible humectant;
  d. from about 0.02 to about 25 parts by weight of a polysaccharide hydrophilic film-forming agent;
  e. from about 0.7 parts to about 7.0 parts by weight of a chemical-leavening composition comprising at least one leavening base and at least one leavening acid with at least 10 percent by weight but less than 30 percent by weight of the total chemical-leavening acid being capable of reacting with said batter leavening base within 60 minutes at a temperature of 60° F. and 760 millimeters pressure, the total amount of leavening acid contained within said batter being characterized as providing at least 0.0003 part moles of carbon dioxide within 60 minutes when said acid is reacted with stoichiometric amounts of sodium bicarbonate at 60° F. and 760 millimeters pressure;

said batter being further characterized as having a sufficient amount of polysaccharide hydrophilic film former in combination with the other batter ingredients to provide a batter having an "S-value" ranging from at least 10 millimeters to about 60 millimeters when 400 grams of said batter containing all of the batter ingredients excepting chemical-leavening composition is aerated in a standard 6-inch mixing bowl with a standard household mixer operated at 550 r.p.m. for 3 minutes at 20° C. with said batter exhibiting a maximum change in "S-value" readings of no greater than 25 percent when "S" readings for said batter are determined at 15, 45, 140 and 180 minutes after said batter has been aerated and the amount of edible humectant is sufficient to provide a batter having a water activity ranging from about 0.80 but no greater than 0.94;

B. placing and sealing said batter in a container having exhaust venting means to permit the egression of gas therefrom;

C. subjecting the batter sealed within said container to a temperature and for a period of time sufficient to enable at least 10 percent by weight but less than 30 percent by weight of the leavening composition provided within said batter to generate carbon dioxide whereby said batter expands and is confined within said container and thereby seals said container from further egression of gas therefrom;

D. storing said container with said expanded batter therein at a temperature of less than 50° F. and thereby maintaining the internal can pressure from about 10 p.s.i. to about 25 p.s.i.

The batter may be prepared under conventional mixing steps in such a manner that a uniform blend of all of the batter components results. Conventional apparatus suitable for providing blended bakery batters such as those conventionally employed in preparing cake batters are adaptable in providing a uniform blend of the batter ingredients. In order to obviate premature leavening activity, the mixing should be conducted at temperatures of less than 70° F. and preferably from about 55° to 65° F. Since it is necessary to provide a uniform distribution of the polysaccharide hydrophilic film former throughout the batter ingredients, it is advantageous first to prepare a uniform aqueous dispersion of the polysaccharide hydrophilic film former and then combine the aqueous dispersion with a uniform dry blend of the major batter dry ingredients. In providing a uniform aqueous dispersion of the polysaccharide, it is preferred to uniformly distribute therein other minor batter ingredients such as flavoring and coloring and sweetening agents (e.g., sucrose), edible humectants and the like. To facilitate uniform distribution of the polysaccharide film former in the aqueous dispersion, it is advantageous to employ heated water (i.e., at about 135° F.) and then cool the aqueous dispersion prior to the addition thereof of the remaining dry blend of major ingredients. To the cooled, aqueous dispersion containing the polysaccharide hydrophilic film former a uniform dry blend of the remaining batter solid ingredients such as farinaceous material, proteinaceous film formers, chemical leavening and the like are then added. As previously mentioned, the chemical leavening should not be incorporated into a heated aqueous medium since the addition thereto would provide premature generation of carbon dioxide.

While maintaining the resultant homogeneous batter (i.e., a uniform blend of batter ingredients) in a cooled state, the batter is then placed and sealed in a container which has an exhaust venting means to permit egression of gas therefrom. Suitable containers are described hereinafter. The batters may be placed into the container with conventional fillers capable of forcing said batter product within said container. In general, the container is not completely filled with the batter but partially filled to permit further expansion of the batter after the can has been sealed. In general, about 90 to about 95 percent of the can is filled with the product and then sealed.

After the batter has been placed and sealed within the container, the batter is then subjected to a temperature and for a period of time sufficient to enable the leavening composition to generate carbon dioxide. Upon generation of the carbon dioxide by the chemical-leavening composition, the batter expands within the container and thereby substantially seals off the exhaust venting means of the can.

The quantum of heat sufficient to expand the batter and thereby prevent further egression of gas from the container (known as proofing) will vary greatly depending upon the particular type of chemical leavening provided within said batter product. Advantageously, the contained batters are subjected to a temperature and for a period of time sufficient to react at least 15 to about 25 percent by weight of the total chemical-leavening composition contained within said batter. Preferably, the contained batters are subjected to a temperature and for a period of time sufficient to react about 20 percent of total total leavening composition contained within said batter when the preferred leavening composition is employed. Proofing under ambient conditions for about 3 hours is normally sufficient to provide about 20 percent reaction between the leavening acid and leavening base contained within said batter. After the batter contained within said containers has been subjected to a temperature and for a period of time sufficient to generate the appropriate amount of carbon dioxide and thereby seal the container, the contained batters are then refrigerated at a temperature of less than 50° F. They are then distributed through normal distribution channels under refrigerated conditions (e.g., normally between 35° F. to 50° F.) to the ultimate consumer thereof. After about a week refrigerated batters provided within a pressurized container pursuant to the aforementioned method develop an internal can pressure ranging from about 10 to about 25 p.s.i. Upon achievement of the maximum internal can pressure within the range of about 10 to 25 p.s.i., the internal gas pressure thereof will maintain at such a level even though the product is stored for an additional 80 days or more.

In another aspect of the present invention there is provided as an article of manufacture a refrigerated batter product, said product comprising:

A. a sealed container being so constructed as to permit the egression of gas from said container;

B. a batter contained within said container, said batter exerting from about 10 to about 25 p.s.i. whereby said batter effectively seals said container substantially against further egression of gas therefrom, said batter being comprised of a uniform blend of:
  a. 100 parts by weight farinaceous material;
  b. from 50 to 200 parts by weight water;
  c. an edible humectant in an amount ranging from about five to about 40 parts by weight;
  d. a polysaccharide hydrophilic film forming agent in an amount ranging from at least about 0.02 to about 25; and,
  e. a chemical-leavening composition comprised of at least one leavening base and at least one leavening acid with said leavening composition being present in an amount ranging from about 0.5 parts by weight to about 6.5 parts by weight for each 100 parts by weight farinaceous material, said batter being further characterized as having minute gas sites uniformly distributed and contained within said batter with a major portion (on a weight basis) of said gas sites being comprised of carbon dioxide with said gas sites being present within said batter in an amount sufficient to exert an internal pressure upon the batter product sufficient to provide an internal container pressure ranging from about 10 to about 25 p.s.i. at 45° F. with the water activity of the batters ranging from about 0.80 to 0.94 or less.

Any sealed container adapted to contain and limit the expansion of the batter while maintaining the expanded batter at an internal can pressure of from about 10 to about 25 p.s.i. after 7 days of storage at 45° F. may be employed. In general, containers of the type conventionally employed for refrigerated laminated dough products may be used (e.g., see U.S. Pat. Nos. 2,478,618 and 3,397,065). Such containers permit the expulsion of gas therefrom when the contained dough product expands. Upon expansion of the dough the venting means are substantially sealed against further gas egression (e.g., expanded dough effectively seals the container). It is advantageous to employ a container with porous interstices which permits the egression of head space gas when the batter expands which in turn effectively seals the porous interstices thereof from further egression of gas.

Since the refrigerated batters herein disclosed lack the unitary and firm structure of the developed dough products, it is advantageous to employ cans of a construction which when opened will maintain the batter as an integral mass. Accordingly, it is advantageous to employ a container of a construction such as disclosed in U.S. Pat. No. 2,638,820 by T. F. Barnes. A container of the construction as disclosed in the Barnes patent, is advantageous to provide an aluminum foil innerlining that provides porous interstices permitting the egression of gas therefrom. When the batter has expanded sufficiently, the interstices are sealed. A 0.00035-inch aluminum foil adhesively bonded to the inner portion of the said can (i.e., as an innerliner) is adequate to provide such porous interstices. Comparatively, a container of a construction such as disclosed in the Barnes patent provides a more convenient means of removing the batter product than conventional laminated dough containers which upon impact completely rupture the container.

Unlike previous refrigerated batters provided in a container, the instant batters contain a substantial amount of carbon dioxide which is obtained through reaction of the chemical-leavening composition contained therein. In general, at least 10 to about 30 percent by weight of the total chemical-leavening composition will have been reacted after the batter has been proofed. Further generation of carbon dioxide through the leavening composition occurs during refrigeration of the batter product. This carbon dioxide generation continues until the maximum pounds per square inch for a given batter product is achieved (normally occurs in about 7 days). After 7 days of storage at 45° F. batters contained within the pressurized container have generated a sufficient amount of carbon dioxide to the extent that normally at least a major portion of the initial leavening composition provided in the freshly prepared batter has been reacted. Since a substantial portion of the chemical-leavening composition has been reacted after about 7 days of storage at 45° F. the resultant batter product generally contains from about 0.5 to about 6.5 parts by weight chemical-leavening composition for each 100 parts by weight flour. Advantageously, the batter product in the pressurized container after 7 days of storage under refrigerated conditions contains from about 0.7 to about 4.5 parts by weight chemical-leavening composition for each 100 parts by weight farinaceous material with a range of about 1.5 to about 3.5 parts by weight being preferred.

After proofing and storage, the amount of carbon dioxide generated by the chemical-leavening composition tends to equilibrate at a maximum internal gas pressure ranging from about 10 to about 25 p.s.i. and maintains itself at such pressure even when stored for 80 days or more. Thus, the instant batters after about 7 days of storage at 45° F. tend to obtain a maximum internal can pressure which is maintained even though the batter product is stored for an additional 80 days or more.

As previously mentioned, the refrigerated batters have a substantially reduced water activity level and this activity level is maintained even though the batter is stored for extensive periods of time (e.g., 90 days at 45° F.). After about 7 days at 45° F., the "S-value" of the refrigerated batter is substantially reduced over that from the initial batter employed in preparing the refrigerated batter product. This change in "S-value" is due to generation of carbon dioxide which aerates the batter to a significantly higher degree than described hereinbefore in relation to the S-testing method and to equilibration of the water initially provided within said batter (i.e., it is more permanently imbibed by the batter ingredients).

In a still more limited aspect of the invention there is provided a batter product suitable for distribution in a pressurized container under refrigerated conditions, with said batter containing the farinaceous material, water, edible humectant and chemical-leavening composition as limited hereinbefore in respect to the batter disclosure above and as additional ingredients sucrose, egg yolk solids and propylene glycol alginate. The weight percent of said additional ingredients on a batter basis is sufficient to provide an "H-value" of at least 135 as ascertained by the following equation:

$$H = 194 + 18.88S - 0.337S^2 - 11.6Y + 28.9Y^2 + 94.9T$$

wherein $S$, $Y$ and $T$ respectively represent the weight percent of sucrose, egg yolk solids and propylene glycol alginate of the total batter weight thereof (i.e., weight percents of the additional ingredients are calculated on a total batter weight basis).

The following examples are illustrative of the invention:

EXAMPLE I

A. Preparation of Corn Bread Batter

Three hundred pounds of water were placed in a 200-gallon heated kettle equipped with an agitator and heated to a temperature of 135° F. To the hot water there was added with thorough mixing 3.0 pounds of propylene glycol alginate with continued agitation until the alginate was uniformly dispersed therein and thereby provide an aqueous dispersion thereof. The hot aqueous dispersion was then cooled to 35° F.

Two hundred-seventy pounds of flour, 170 pounds of corn meal, 4 pounds sodium stearyl-2-lactylate, 2.0 pounds sodium aluminum phosphate (SALP), 8.4 pounds sodium acid pyrophosphate (SAPP—24.3 percent carbon dioxide evolved in 8 minutes at 27° C.), 8.0 pounds sodium bicarbonate and 11 pounds egg yolk solids were uniformly dry blended together in a ribbon blender. About 55 percent by weight of the cooled aqueous dispersion was then added to the ribbon blender containing the dry blended ingredients while operating the blender at a mixing speed of 30 r.p.m. about 1 minute of mixing, 40 pounds of a hydrogenated vegetable shortening was uniformly added to the blender while continuing the mixing thereof for an additional 3 minutes. The remaining 45 percent of the cooled aqueous dispersion was then added to the blender and mixed for an additional 3 minutes thereby providing a uniform blend of batter ingredients. The resultant batter was then placed in containers having a diameter of 2 13/16 inches and a height of 4¼ inches and of a construction such as disclosed in U.S. Pat. NO. 2,638,820 by T. F. Barnes. The batters were placed into the containers by a piston-type filler allowing an ½-inch head space. The containers containing the batter product were sealed by a capper and then proofed under ambient conditions for 3 hours. The proofed container and batter were then placed in a refrigerator. After 90 days of storage at 40° F., the batters were removed from the containers and baked in an over at a temperature of 425° F. for 16 minutes. Baked products prepared from freshly prepared batter provided no greater than a 10 percent increased baked volume from those stored under such conditions. The grain and texture of the resultant baked products were excellent.

EXAMPLE II

A. Cake Batters Suitable for Storage in a Pressurized Container Over Prolonged Periods of Time Employing the methodology as disclosed in example I, cake batters of the following composition were prepared:

| INGREDIENTS | PERCENT BY WEIGHT |
| --- | --- |
| flour | 28.7 |
| water | 27.4 |
| sucrose | 28.7 |
| hydrogenated vegetable shortening | 9.0 |
| sodium stearyl-2-lactylate | 0.2 |
| propylene glycol alginate | 0.2 |
| dried egg albumen | 0.7 |
| dried egg albumen | 0.7 |
| dried egg yolk | 2.0 |
| SALP | 0.4 |

| | |
|---|---|
| SAPP | 0.2 |
| sodium bicarbonate | 0.4 |
| salt | 1.0 |
| dextrose | 2.0 |
| flavoring | 0.1 |

The resultant batter was then packaged in a container of the type described in example I, proofed and stored for 90 days at 40° F. In comparison to freshly prepared batters, it was observed that baked products therefrom exhibited less than 10 percent volume loss with a cake grain and texture of excellent quality. No migration or syneresis of water in the stored batter product was detectable.

What is claimed is:

1. An edible batter suitable for distribution within a pressurized container, said batter being comprised of a homogeneous admixture of:
   a. 100 parts by weight farinaceous material;
   b. from 50 to 200 parts by weight water;
   c. from about three to about 50 parts by weight of an edible humectant;
   d. from about 0.2 to about 25 parts by weight of a polysaccharide hydrophilic film forming agent; and,
   e. from about 0.7 parts to about 7.0 parts by weight chemical-leavening composition comprised of at least one leavening base and at least one leavening acid with at least 10 percent by weight but less than 30 percent by weight of the total chemical-leavening acid being capable of reacting with said batter leavening base in 60 minutes at a temperature of 60° F. and 760 millimeters pressure, the total amount of leavening acid being characterized as providing at least 0.0003 moles of carbon dioxide in 60 minutes when said acid is reacted with stoichiometric amounts of sodium bicarbonate at 60° F. and 760 millimeters pressure, said batter being further characterized as having a sufficient amount of polysaccharide hydrophilic film former in combination with the other batter ingredients to provide a batter having an "S-value" between 10 millimeters and 60 millimeters when 400 grams of said batter containing all of the batter ingredients excepting chemical-leavening composition is aerated in a 6-inch standard mixing bowl with a standard household mixer operated at 550 r.p.m. for 3 minutes at 20° C. with said batter exhibiting a maximum change in "S-value" readings of no greater than 25 percent when "S" readings for said batter are determined at 15, 45, 140 and 180 minutes after said batter has been aerated and said edible humectant is sufficient to provide a batter having a water activity ranging from about 0.80 to 0.94.

2. The batter according to claim 1 wherein said farinaceous material provides a flour-protein content between about 5 and about 20 percent of the total farinaceous weight.

3. The batter according to claim 2 wherein the maximum change in "S" readings is less than 20 percent and said batter has an "S-value" between 25 and 50 millimeters.

4. The batter according to claim 3 wherein said batter contains at least five to about 35 parts by weight edible humectant and from about 0.2 to about five parts by weight of a hydrophilic film former, said parts by weight being based upon 100 parts by weight farinaceous material.

5. The batter according to claim 4 comprising 75 to 175 parts by weight water for each 100 parts by weight farinaceous material.

6. The batter according to claim 5 comprising from about one to about five parts by weight chemical-leavening composition for each 100 parts by weight farinaceous material.

7. The batter according to claim 6 comprising from 90 to 150 parts by weight water for each 100 parts by weight farinaceous material.

8. The batter according to claim 7 comprising from 0.1 to three parts by weight of polysaccharide hydrophilic film former for each 100 parts by weight farinaceous material.

9. The batter according to claim 8 comprising from 10 to 30 parts by weight of edible humectant for each 100 parts by weight farinaceous material.

10. The batter according to claim 9 comprising from about two to about four parts by weight chemical-leavening composition for each 100 parts by weight farinaceous material.

11. The batter according to claim 10 wherein the farinaceous material is comprised of a wheat flour having a protein content of from at least 7.5 to about 15 percent by weight of the wheat flour.

12. The batter according to claim 11 wherein said batter is characterized as exhibiting a maximum change in "S-value" readings of no greater than 10 percent and the "S-value" is from 35 to 45, said batter having a water activity of from about 0.80 to 0.90.

13. The batter according to claim 12 wherein said batter contains as additional ingredients sucrose, egg yolk solids and propylene glycol alginate with the weight percent of said additional ingredients on a total batter weight basis being sufficient to provide an "H-value" of at least 135 as ascertained by the following equation:

14. A method for preparing batters suitable for distribution in a pressurized container, said method comprising the steps of:
   A. providing a batter comprised of a uniform blend of:
      a. 100 parts by weight farinaceous material;
      b. from 50 to 200 parts by weight water;
      c. from about three to about 50 parts by weight of an edible humectant;
      d. from about 0.02 to about 25 parts by weight of a polysaccharide hydrophilic film forming agent; and,
      e. from about 0.7 to about 7.0 parts by weight chemical-leavening composition comprised of at least one leavening base and at least one leavening acid with at least 10 percent by weight but less than 30 percent by weight of the total chemical-leavening acid being capable of reacting with said batter leavening base in 60 minutes at a temperature of 60° F. and 760 millimeters pressure, the total amount of leavening acid being characterized as providing at least 0.0003 moles of carbon dioxide in 60 minutes when said acid is reacted with stoichiometric amounts of sodium bicarbonate at 60° F. and 760 millimeters pressure, said batter being further characterized as having a sufficient amount of polysaccharide hydrophilic film former in combination with the other batter ingredients to provide a batter having an "S-value" between 10 millimeters and 60 millimeters when 400 grams of said batter containing all of the batter ingredients excepting chemical-leavening composition is aerated in a 6-inch standard mixing bowl with a standard household mixer operated at 550 r.p.m. for 3 minutes at 20° C. with said batter exhibiting a maximum change in "S-value" readings no greater than 25 percent when "S" readings for said batter are determined at 15, 45, 140 and 180 minutes after said batter has been aerated and said edible humectant is sufficient to provide a batter having a water activity ranging from about 0.80 to 0.94.
   B. placing and sealing said batter in a container having exhaust venting means to permit the egression of gas therefrom.
   C. subjecting the batter sealed within said container to a temperature and for a period of time sufficient to enable at least 10 percent by weight but less than 30 percent by weight of the leavening composition provided within said batter to generate carbon dioxide whereby said batter expands and is confined within said container and thereby sealing said container from further egression of gas therefrom.
   D. storing said container with said expanded batter therein at a temperature of less than 50° F. and thereby maintaining the internal can pressure from about 10 p.s.i. to about 25 p.s.i.

15. The method according to claim 14 wherein said farinaceous material provides a flour-protein content of from about 5 to about 20 percent of the total farinaceous weight.

16. The method according to claim 15 wherein the maximum change in "S" readings is less than 20 percent and said batter has an "S-value" of from 25 to 50 millimeters.

17. The method according to claim 16 wherein said batter contains at least five to about 35 parts by weight edible humectant and from about 0.02 to about five parts by weight of a hydrophilic film former said parts by weight being based upon 100 parts by weight farinaceous material.

18. The method according to claim 17 wherein said batter comprises from 75 to 175 parts by weight water for each 100 parts by weight farinaceous material.

19. The method according to claim 18 wherein said batter comprises from about one to about five parts by weight chemical-leavening composition for each 100 parts by weight farinaceous material and the water activity level of said batter is no greater than 0.90.

20. The method according to claim 19 wherein the amount of water contained within said batter is from 90 to 150 parts by weight water for each 100 parts by weight farinaceous material.

21. The method according to claim 20 wherein said batter comprises from 0.1 to three parts by weight polysaccharide hydrophilic film former for each 100 parts by weight farinaceous material.

22. The method according to claim 21 wherein the amount of edible humectant provided within said batter is from 10 to 30 parts by weight edible humectant for each 100 parts by weight farinaceous material.

23. The method according to claim 22 wherein the amount of chemical-leavening composition contained within said batter is from about two to about four parts by weight chemical-leavening composition for each 100 parts by weight farinaceous material.

24. The method according to claim 23 wherein the farinaceous material is comprised of wheat flour having a protein content of from at least 7.5 to about 15 percent by weight of the wheat flour.

25. The method according to claim 24 wherein said batter is characterized as exhibiting a maximum change in "S-value" readings of no greater than 10 percent and the "S-value" is from 35 to 45, said batter having a water activity of from about 0.80 to 0.90.

26. The method according to claim 25 wherein said batter contains as additional ingredients sucrose, egg yolk solids and propylene glycol alginate, with the percent of said additional ingredients on a total batter weight basis being sufficient to provide an "H-value" of at least 135 as ascertained by the following equation:

$$H = 194 + 18.88S - 0.337S^2 - 11.6Y + 28.9Y^2 + 94.9P$$ wherein $S$, $Y$ and $P$ respectively represent the weight percent of sucrose, egg yolk solids and propylene glycol alginate.

27. As an article of manufacture a refrigerated batter product, said product comprising:
A. a sealed container being so constructed as to permit the egression of gas from said container;
B. a batter contained within said container, said batter exerting from about 10 to about 25 p.s.i. with said batter being sufficient to seal said container substantially against further egression of gas therefrom said batter being comprised of a uniform blend of:
a. 100 parts by weight farinaceous material;
b. from 50 to 200 parts by weight water;
c. from about three to about 50 parts by weight of an edible humectant;
d. from about 0.02 to about 25 parts by weight of a polysaccharide hydrophilic film-forming agent; and,
e. from about 0.5 parts to about 6.5 parts of a chemical-leavening composition for each 100 parts of farinaceous material, said chemical-leavening composition comprising at least one leavening base and at least one leavening acid, said batter being further characterized as having minute gas sites uniformly distributed and contained within said batter with a major portion of said gas sites being comprised of carbon dioxide with said gas sites being present within said batter in an amount sufficient to exert an internal pressure upon the batter product sufficient to provide an internal container pressure of from about 10 to about 25 p.s.i. at 45° F.; said batter having a water activity of from about 0.80 to about 0.94.

28. The batter product according to claim 27 wherein said farinaceous material provides a flour-protein content of from about 5 to about 20 percent of the total farinaceous weight.

29. The batter product according to claim 28 wherein said batter contains at least five to about 35 parts by weight edible humectant and from about 0.02 to five parts by weight of a hydrophilic film former with said parts by weight being based upon 100 parts by weight farinaceous material.

30. The batter product according to claim 29 comprising 75 to 175 parts by weight water for each 100 parts by weight farinaceous material.

31. The batter product according to claim 30 comprising from about 0.7 to about 4.5 parts by weight chemical-leavening composition for each 100 parts by weight farinaceous material.

32. The batter product according to claim 31 comprising from 90 to 150 parts by weight water for each 100 parts by weight flour.

33. The batter product according to claim 32 comprising from 0.1 to three parts by weight of polysaccharide hydrophilic film former for each 100 parts by weight farinaceous material.

34. The batter according to claim 33 comprising from 10 to 30 parts by weight of edible humectant for each 100 parts by weight farinaceous material.

35. The batter according to claim 34 comprising from about 1.5 to about 3.5 parts by weight chemical-leavening composition for each 100 parts by weight farinaceous material.

36. The batter according to claim 35 wherein the farinaceous material is comprised of a wheat flour having a protein content of from at least 7.5 to about 15 percent by weight of the wheat flour.

37. The batter according to claim 36 having a water activity of from about 0.80 to 0.90.

38. The batter according to claim 37 wherein said batter contains as additional ingredients sucrose, egg yolk solids and propylene glycol alginate, with the weight percent of said additional ingredients on a total batter weight basis being sufficient to provide an "H-value" of at least 135 as ascertained by the following equation:

$$H = 194 + 18.88S - 0.337S^2 - 11.6Y + 28.9Y^2 + 94.9P$$ wherein $S, Y$ and $p$ respectively represent the weight percent of sucrose, egg yolk solids and propylene glycol alginate.

39. The product according to claim 34 wherein said container is provided with a plurality of porous interstices which are effectively sealed by said batter.

* * * * *

UNITED STATES PATENT OFFICE
CERTIFICATE OF CORRECTION

Patent No. 3,620,763            Dated November 16, 1971

Inventor(s) Richard G. Hans

It is certified that error appears in the above-identified patent and that said Letters Patent are hereby corrected as shown below:

Column 15, line 31, after "0.0003 moles", insert -- (expressed in parts by weight) -- . Column 16, line 18, insert the following equation,
-- $H = 194 + 18.888 - .337S^2 - 11.6Y + 28.9Y^2 + 94.9P$ wherein S, Y and P respectively represent the weight per cent of sucrose, egg yolk solids and propylene glycol alginate. -- ; line 38, after "0.0003 moles", insert -- (expressed in parts by weight) -- . Column 18, line 10, after "a major portion", insert -- (on a weight basis) -- .

Signed and sealed this 17th day of October 1972.

(SEAL)
Attest:

EDWARD M. FLETCHER, JR.            ROBERT GOTTSCHALK
Attesting Officer            Commissioner of Patents